United States Patent [19]

McGrath et al.

[11] Patent Number: 5,166,274
[45] Date of Patent: Nov. 24, 1992

[54] BLOCK POLYMERS CONTAINING METHACRYLIC ACID AND DERIVATIVES THEREOF

[75] Inventors: James E. McGrath, Blacksburg, Va.; Timothy E. Long, Rochester, N.Y.; Allan D. Broske, Erie, Pa.; Lu H. Tung, Midland, Mich.

[73] Assignee: The Dow Chemical Company, Midland, Mich.

[21] Appl. No.: 560,265

[22] Filed: Jul. 30, 1990

Related U.S. Application Data

[63] Continuation of Ser. No. 382,597, Jul. 21, 1989, abandoned.

[51] Int. Cl.$^5$ ............... C08F 291/02; C08F 293/00; C08F 297/02
[52] U.S. Cl. .................................. 525/310; 525/271; 525/301; 525/302
[58] Field of Search ............... 525/271, 310, 301, 302

[56] References Cited

U.S. PATENT DOCUMENTS

| 3,069,380 | 12/1962 | Nozaki et al. | 525/299 |
| 3,890,408 | 6/1975 | Schepers et al. | 525/271 |
| 4,461,874 | 7/1984 | Teyssie et al. | 525/299 |

*Primary Examiner*—Jacob Ziegler

[57] ABSTRACT

Novel diene/methacrylate ester block polymers, especially tertiary butyl methacrylate ester block polymers are uniquely prepared at near ambient temperatures and capable of being hydrolyzed and neutralized to yield the corresponding methacrylic acid and methacrylic acid salt (ionomer) derivatives. The compositions are usefully employed in the preparation of thermoplastic elastomers, adhesives and laminating films.

6 Claims, No Drawings

BLOCK POLYMERS CONTAINING METHACRYLIC ACID AND DERIVATIVES THEREOF

CROSS-REFERENCE TO RELATED APPLICATION

This is a continuation of application Ser. No. 382,597 filed Jul. 21, 1989 now abandoned.

BACKGROUND OF THE INVENTION

The present invention relates to block polymers comprising methacrylic acid and derivatives of methacrylic acid as well as method for the preparation of such block polymers. In the past, carboxylic acid containing polymers have been typically synthesized by the direct free radical polymerization of various carboxylic acids, as well as ester, or anhydride derivatives thereof with various vinyl comonomers. The corresponding carboxylic salt derivatives or ionomers are typically prepared by partial or complete neutralization of carboxylic acid groups with various basic compounds. Previously known synthetic routes have resulted in the random placement of such acid or ionic groups along polymer backbones. It would be desirable to provide similar polymeric structures having controlled composition and architecture, predictable molecular weights and narrow molecular weight distributions.

It is previously known to use anionic polymerization techniques for the preparation of block polymers having controlled morphology and composition as well as architecture and predictable molecular weights, as well as narrow molecular weight distributions. However, previous attempts to prepare diene-containing block copolymers additionally comprising carboxylic acid or ester moieties have not been successful due to competing reactions involving the carbonyl functionality of such monomers. The incidents of such undesired competing reactions can be severely reduced or even eliminated by the use of protecting groups in the block copolymer chain. For example, 1,1-diphenylethylene polymerized between blocks of ethylenically unsaturated carboxylic acids or esters and diene blocks may be employed to prepare block copolymers in relatively high purity.

Regardless of the method of preparation, such techniques have required the use of reduced temperatures as low as $-50°$ C. or $-80°$ C. due to the instability of the intermediate anionic species. Moreover, 1,1-diphenylethylene is both expensive and of a limited availability, and accordingly, processes involving its use have proven excessively costly.

Group Transfer Polymerization techniques have recently been employed in order to prepare block polymers of polar monomers such as the alkyl methacrylates. Disadvantageously such techniques are not applicable to the preparation of diene containing block polymers.

It would be desirable if there were provided a process for preparing block polymers of diene and carboxylic acids as well as esters or neutral salts thereof which do not require the use of commercially impractical reaction conditions such as reduced temperatures less than $0°$ C. In addition, it would be desirable to provide a process for the preparation of block polymers comprising dienes and carboxylic acids, as well as esters or neutral salts thereof that does not require the use of expensive reagents such as 1,1-diphenylethylene.

SUMMARY OF THE INVENTION

According to the present invention, there are now provided novel block polymers comprising in polymerized form one or more conjugated diene or hydrogenated diene moieties and one or more moieties selected from the group consisting of hydrolyzable esters of methacrylic acid having from 2 to 20 carbons in the ester group, methacrylic acid and salts of methacrylic acid. In a preferred embodiment these block polymers correspond to the Formula:

wherein A is a polymer comprising one or more moieties selected from the group consisting of hydrolyzable esters of methacrylic acid having from 2 to 20 carbons in the ester group, methacrylic acid and salts of methacrylic acid, D is a diene polymer or a hydrogenated diene polymer, and x is a number from 0 to 3 equal to the average number of branches in the block polymer. The block polymers of the invention may be in the form of diblock-, triblock-, or star block polymers.

In addition, the present invention encompasses a method for the preparation of such block polymers comprising contacting a living diene polymer anion with one or more hydrolyzable methacrylate ester monomers having from 2 to 20 carbons in the ester group under anionic polymerization conditions. By later applied conventional techniques, the ester functionality of the block polymer may be altered to yield acid or neutral salt derivatives having an ordered placement of functional groups. In addition, residual ethylenic functionality may be hydrogenated. According to the present method, it has been found expeditious to prepare the block polymers of the invention in high yields utilizing commercially acceptable reaction conditions, especially temperatures for the initial methacrylate ester addition on the order of $0°$ C. to about $35°$ C., preferably from about $10°$ C. to about $35°$ C. Moreover, by use of the present process, the need to use 1,1-diphenylethylene to obtain addition of the methacrylate ester to the block polymer is avoided.

DETAILED DESCRIPTION OF THE INVENTION

Anionic polymerization techniques are well known and previously disclosed in the art. See, for example, M. Morton, "Anionic Polymerization Principles and Practice", Academic Press (1983). Briefly, a living anion is prepared by use of a reactive anionic polymerization initiator. Suitable initiators include the well known metals such as sodium and lithium as well as the more preferred metal alkyl compounds particularly lithium alkyls. A particularly preferred monofunctional anionic initiator is sec-butyl lithium. Di- and other multifunctional initiators are also previously known in the art. Preferred difunctional anionic initiators include those compositions disclosed in U.S. Pat. Nos. 4,172,190: 4,196,154; 4,172,100: 4,182,818: 4,196,153; 4,200,718; 4,205,016: and 4,201,729: the teachings of which are incorporated herein by references thereto. Block polymers having up to four reactive living ends may be prepared by the use of suitable multifunctional anionic initiator technology.

Aliphatic dienes, particularly conjugated aliphatic dienes, such as butadiene or isoprene are particularly well suited for the preparation of block polymers having a desirable low glass transition temperature (Tg). Such block polymers possessing elastomeric properties preferably have glass transition temperatures less than about 0° C., most preferably less than about −25° C. By the use of conventional hydrogenation techniques, residual unsaturation in such block polymers may be substantially reduced thereby imparting improved ultraviolet light stability to the polymers. The resulting elastomers are particularly well suited for use in impact modification of thermoplastic polymers for use in preparing structures requiring improved environmental weathering resistance.

The block polymers of the present invention may be prepared utilizing conventional anionic polymerization conditions and initiators. In the first step, a living diene polymer anion is prepared by anionic polymerization techniques and retained in solution for use in the next step. The initial polymerization is preferably conducted in a solvent, particularly an inert, aprotic, organic liquid such as toluene, hexane, cyclohexane, etc. A preferred solvent is cyclohexane.

Suitable diene polymers include homopolymers of the above mentioned dienes and polymers thereof with polymerizable ethylenically unsaturated comonomers. Preferred diene polymers are block polymers containing one or more diene homopolymer blocks and one or more monovinylidene aromatic monomer homopolymer blocks.

In one preferred embodiment, it has been found desirable to employ a living diene polymer anion as further defined by the formula:

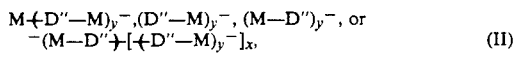
(II)

wherein D″ is a diene homopolymer block, M is a monovinylidene aromatic monomer homopolymer block, y is a number greater than 0 that is equal to the average number of repeating diene and monovinylidene aromatic monomer homopolymer blocks, and x is as previously defined. The resulting block polymers of the invention therefore correspond to the formula:

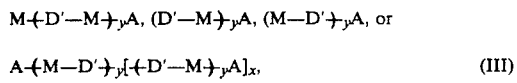
(III)

wherein D′ is a diene homopolymer block or a hydrogenated derivative thereof, and M, A, x, and y are as previously defined. In the above equations, the first, second and third appearing compounds are prepared by the use of a monofunctional initiator and the initial polymerization of either the monovinylidene aromatic monomer or the diene monomer respectively. The compositions corresponding to the fourth formula are prepared by the use of multifunctional initiators.

In the resulting block polymers, it is desirable that the diene polymer block (D of formula I) comprise homopolymer blocks of a monovinylidene aromatic monomer and diene homopolymer blocks such that the monovinylidene aromatic monomer homopolymer blocks are interposed between the A blocks and the diene homopolymer blocks or hydrogenated derivatives thereof.

Suitably, the weight ratio of monovinylidene aromatic monomer homopolymer block to diene homopolymer block may be from about 1/100 to about 10/1. Preferably, in order to preserve the elastomeric properties of the block polymer, the weight ratio of monovinylidene aromatic monomer homopolymer block to diene homopolymer block is from about 1/100 to about 1/1. A preferred monovinylidene aromatic monomer is styrene.

Next, the living diene polymer anion is contacted with a hydrolyzable methacrylate ester monomer having from 2 to 20 carbons in the ester group under anionic polymerization conditions so as to prepare a diene/methacrylate ester block polymer. The living polymer is then terminated by any suitable technique. At this point, residual unsaturation of the diene polymer may be hydrogenated if desired. The resulting block polymer may be represented by the formula: $A'—D(-D—A')_x$, wherein A′ is a polymer comprising one or more hydrolyzable methacrylate ester moieties having from 2 to 20 carbons in the ester group, D is a diene polymer or a hydrogenated diene polymer, and x+1 corresponds to the functionality of the initiator used.

The addition of the hydrolyzable ester functionality to the living diene anion has been found to be beneficially advanced by the addition to the reaction mixture of a polar, aprotic organic compound in a quantity sufficient to modify the polymerization rate of the reaction. Suitable polar organic compounds include polar aprotic organic compounds exemplified by the cyclic ethers, particularly tetrahydrofuran. Preferably, the polar organic compound is employed in an amount from about 0.5 to about 90 weight percent, most preferably from about 25 to about 75 weight percent based on total solvent weight. Preferably, the polar organic compound is added to the reaction mixture after formation of the living diene polymer anion.

To produce the highly desired methacrylic acid containing block polymers of the invention, the ester functionality of the above block polymers may be hydrolyzed. As an aid in such hydrolysis, it is desirable that the hydrolyzable methacrylate ester be selected to provide ease of operating conditions and good selectivity to the methacrylic acid derivative upon hydrolysis. Suitable hydrolyzable methylacrylate esters are those capable of addition under anionic polymerization conditions to a living diene anion preferably at a temperature from about 0° C. to about 35° C. In a highly preferred embodiment, the hydrolyzable ester group of the methacrylate ester is easily removable under nonaqueous hydrolysis reaction conditions. Suitably, the hydrolysis is conducted by heating the resulting polymer containing hydrolyzable methacrylate ester groups, optionally in the presence of a catalytic amount of an acid.

Preferred hydrolyzable methacrylate esters for use in the present invention are the tertiary alkyl methacrylates. Utilizing tertiary alkyl methacrylates, it has been discovered that polymerization temperatures on the order of 0° C. to about 35° C. may be suitably employed in the polymerization. This beneficial effect is believed to be due to the stability of the t-alkyl methacrylate enolate anion at such temperatures. Advantageously, heating of the resulting methacrylate ester containing block polymer, optionally in the presence of at least a catalytic amount of an acid results in alkyl-oxygen cleavage and the release of relatively volatile aliphatic reaction products and the formation of the desired methacrylic acid functionalized block polymers. Suitable acids for the above hydrolysis include the aromatic sulfonic acids, especially toluene sulfonic acid. It is understood that hydrolysis of only a portion of the ester functionality may be obtained according to the present method if desired.

Because 4-7 carbon membered alkenes which are the alkenes resulting from hydrolysis of tertiary butyl-, or 2-methyl-2-butyl-, and other 4-7 carbon tertiary alkyl methacrylate esters are easily volatilized, they are the preferred tertiary alkyl methacrylate esters for use in the present invention. A highly preferred hydrolyzable, tertiary alkyl methacrylate is t-butyl methacrylate.

In the hydrolysis, a small or catalytic amount of the acid and mild temperatures on the order of about 50° to 100° C. are employed. A suitable solvent selected to maintain solubility may be employed to lead to higher degrees of hydrolysis. An example of such a suitable solvent includes toluene, particularly where the amount of an incorporated hydrolyzable methacrylate ester functionality is less than about 10 percent by weight. Block polymers containing additional amounts of hydrolyzable methacrylate ester functionality may more beneficially be maintained in solution by the use of more polar solvents such as, for example, alcohols. In a desirable embodiment, the hydrolysis reaction is conducted quantitatively in order to be able to more accurately control the final acid or ion content of the block polymer.

In addition to the catalytic acid hydrolysis, the methacrylate ester functionality may also be hydrolyzed by the use of an alkali metal superperoxide such as potassium superperoxide in a suitable solvent such as a mixture of dimethyl sulfoxide and tetrahydrofuran. The resulting hydrolyzed product may be acidified with small amounts of an acid such as hydrogen chloride to improve solubility. Due to the difficulty in handling such reagents, the latter method is not preferred for commercial use.

Where desired, the acid functionality of the methacrylic acid containing block polymers may be neutralized by contacting with a suitable basic reagent. Examples include ammonium and metal hydroxides particularly the alkali metal hydroxides. Particularly desirable metal salts of methacrylic acid include sodium, potassium, aluminum, tin, zinc, or nickel salts. By such techniques, ionomeric block copolymers containing methacrylic acid salt moieties are prepared.

Although any desired amount of neutralization of the acid functionality may be employed, in a preferred embodiment from about 5 to about 75 percent by weight of the functional moieties of the block polymer are the neutral salts thereof. In other respects, the neutralization process to produce ionomeric functionality in the resulting diene/methacrylic acid block polymers is as previously known in the art.

In a desired embodiment of the present invention, the ethylenic unsaturation of the polydiene block polymers of the invention is hydrogenated to provide modified polymeric properties. Such hydrogenation is accomplished by the use of conventional processing conditions such as contacting with hydrogen in the presence of a noble metal catalyst. The above described hydrogenation process may be accomplished at any point during the synthesis. That is, the hydrogenation may be performed after addition of the hydrolyzable methacrylate ester functionality but before hydrolysis, after hydrolysis but before neutralization, or after neutralization.

The modified block polymers of the present invention may suitably be employed as surfactants, elastomers, and as adhesives. In addition, by the selective addition of methacrylate ester functionality to diene block polymers according to the present invention, properties such as refractive index may be modified in order to provide elastomers for particularly utilization in the preparation of transparent impact modified thermoplastic polymers.

Having described the invention, the following examples are provided as further illustrative and are not to be construed as limiting.

EXAMPLE 1

Block copolymers are prepared by reaction of suitable monomers with a difunctional initiator. Isoprene, 40 g, is added to a stirred, heated, glass bowl polymerization reactor that has been previously purged with nitrogen and charged with cyclohexane (500 ml). The initiator, 1,3-phenylene-bis(3-methyl-1-phenylpentylidene)bis(lithium), prepared according to the teachings of U.S. Pat No. 4,196,154, (0.5 mmole) as a 1.35 Molar solution in cyclohexane is added and the reactor is heated to 60° C. and maintained at this temperature for 2 hours. Following complete isoprene polymerization, an aliquot of the living polymer solution (containing approximately 10 g of polymer) is removed for further modification.

In the next step, tertiary-butyl methacrylate (4.0 g) is added to the living polymer solution in a reactor at about 25° C. The reaction is continued one additional hour. The polymerization is terminated by adding methanol to the reactor and the product is recovered by precipitation from a methanol/water solution (90/10 by volume). Analysis by nuclear magnetic resonance spectroscopy indicates a final polymerized tertiary-butyl methacrylate content of 29 mole percent. The tacticity as measured by $C^{13}$ NMR is greater than 99 percent. A clear film suitable for use as a coating or packaging sheet may be cast from cyclohexane solution.

EXAMPLE 2

The reaction conditions of Example 1 are substantially repeated excepting that the solvent employed during tertiary-butyl methacrylate addition is a mixture of cyclohexane and tetrahydrofuran (50/50 by volume). The resulting polymer has a polymerized tertiary-butyl methacrylate content of 30 weight percent. The polymer has a 1,4-diene polymer content of 92 mole percent, and 52 percent syndiotacticity about the methacrylate quaternary carbon.

EXAMPLE 3

The reaction conditions of Example 1 are substantially repeated excepting that a minor amount of styrene monomer (5 weight percent) is added to the isoprene aliquot in a reactor and polymerized to form a terminal block prior to addition of the tertiary-butyl methacrylate. The resulting triblock polymer has the formula: A—M—D—M—A, wherein A, M, and D represent the polymerized monomers tertiary-butyl methacrylate, styrene and isoprene, respectively. Analysis by nuclear magnetic resonance spectroscopy indicates the final polymerized monomer content is approximately 62 percent isoprene, 5 percent styrene, and 33 percent tertiary-butyl methacrylate.

EXAMPLE 4

The reaction conditions of Example 3 are substantially repeated excepting that the solvent employed during the polymerization of tertiary butyl methacrylate is a mixture of cyclohexane and tetrahydrofuran (50/50 by volume). The resulting polymer has a polymerized tertiary-butyl methacrylate content of 30 mole percent. The polymer has 92 mole percent, 1,4-diene polymer content and 52 percent syndiotacticity about the diene double bond. The molecular weight distribution is 1.25.

EXAMPLE 5

The reaction conditions of Example 1 are substantially repeated excepting that a monofunctional initiator, sec-butyl lithium, 0.5 mmoles, is employed to prepare diblock polymers of the formula: A—D, wherein A and D represent the polymerized form of tertiary-butyl methacrylate and isoprene respectively. The resulting polymer has a tertiary-butyl methacrylate content of about 33 weight percent. The number average molecular weight as determined by gel permeation chromatography is 126,000 g/mole. The molecular weight distribution is 1.09.

EXAMPLE 6

The block copolymer of Example 1 (2.0 g.) in toluene solution is heated to 80° C. in the presence of para-toluene sulfonic acid (5 mole percent) to evolve isobutylene and a triblock copolymer of the formula A—D—A, having polymerized isoprene center block and methacrylic acid terminal blocks. Substantially complete conversion of tertiary-butyl groups is obtained in about 90 minutes. The product is cast from toluene solution to result in a clear film suitable for use as a coating or an adhesive film.

EXAMPLE 7

The methacrylic acid functionalized triblock polymer of Example 6 is converted to an ionomer functionalized polymer by titrating the same in tetrahydrofuran solution utilizing potassium hydroxide (0.1 Molar in methanol) and phenolphthalein as an indicator. Greater than 95 percent conversion of acid functionality is obtained. The resulting polymer is compression molded to prepare a thin disk for further property testing. The disk is elastic and insoluble in hydrocarbon solvents.

What is claimed is:

1. A thermoplastic block polymer consisting essentially of in polymerized form, one or more diene or hydrogenated diene moieties and one or more moieties selected from the group consisting of hydrolyzable tertiary alkyl esters of methacrylic acid, methacrylic acid, and salts of methacrylic acid.

2. A thermoplastic block polymer corresponding to the Formula A—D—(D—A)$_x$, wherein A is a polymer block consisting essentially of one or more moieties selected from the group consisting of hydrolyzable tertiary alkyl esters of methacrylic acid, methacrylic acid and salts of methacrylic acid, D is a diene polymer of hydrogenated diene polymer block and x is a number from 0 to 3 equal to the average number of branches of (D—A) in the block polymer.

3. A block polymer according to claim 1 wherein the diene is butadiene or isoprene.

4. A block polymer according to claim 3 wherein the hydrolyzable tertiary alkyl ester is tertiary butyl methacrylate.

5. A block polymer according to claim 2 wherein D is a polymer block of butadiene or isoprene.

6. A block polymer according to claim 5 wherein the hydrolyzable tertiary alkyl ester is tertiary butyl methacrylate.

* * * * *